Feb. 20, 1934.     A. R. DAVIS     1,947,972
LUBRICATING MEANS FOR SPINDLES
Filed Oct. 14, 1932
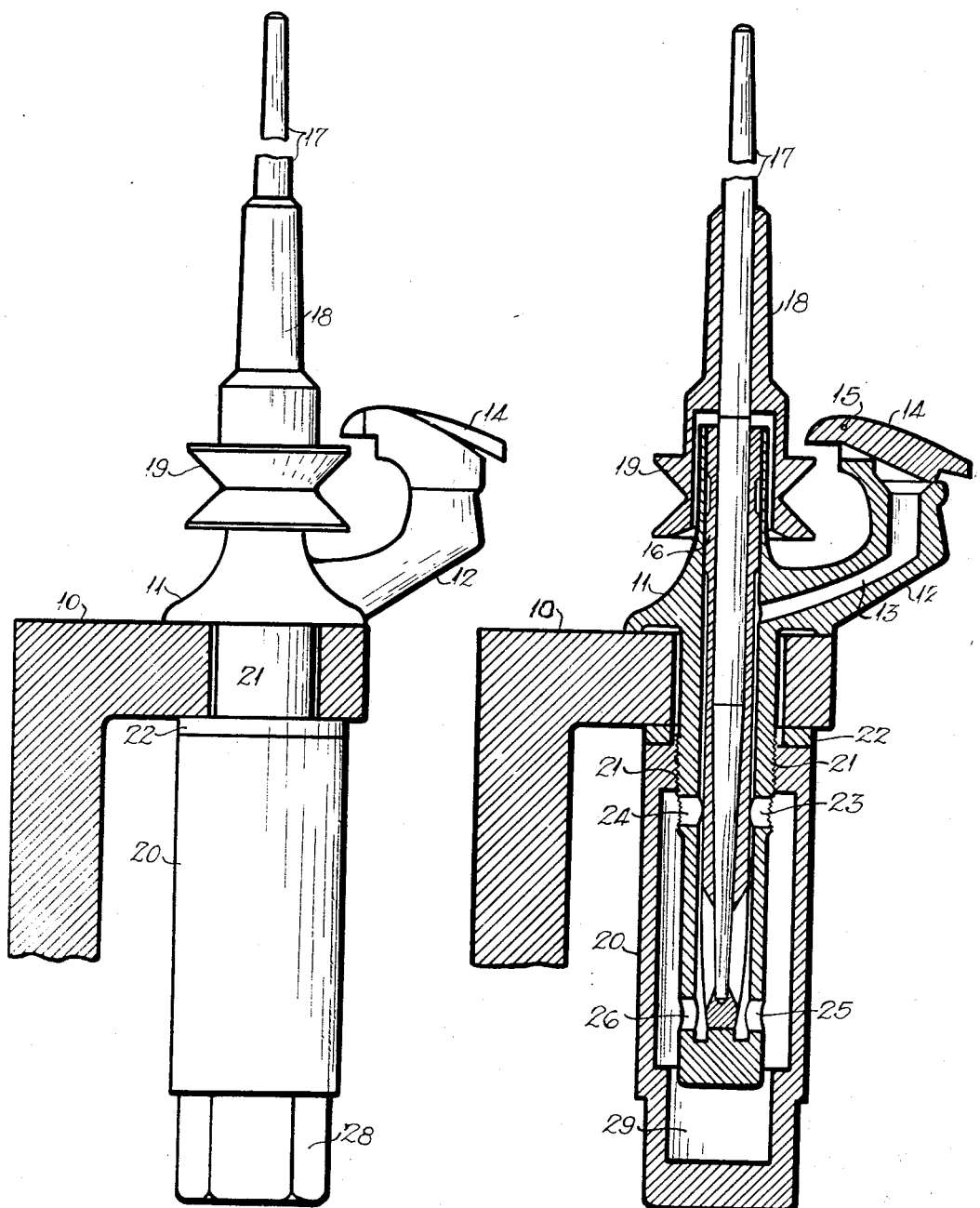
Inventor:
ALEXANDER R. DAVIS
By Paul R. Eaton
Attorney Patented Feb. 20, 1934

1,947,972

UNITED STATES PATENT OFFICE 1,947,972

LUBRICATING MEANS FOR SPINDLES

Alexander R. Davis, Charlotte, N. C.

Application October 14, 1932. Serial No. 637,737

2 Claims. (Cl. 118—63)

This invention relates to novel means of lubricating spindles in machines used in the preparation of textile fibers, and more especially to means attachable to present type spindle bases for providing the same with a reservoir for the reception of a lubricant from which the spindle is lubricated.

It is an object of this invention to provide a lubricant reservoir adapted to be screwed onto textile spindles to replace the conventional nut heretofore used for securing the spindle base to the spindle rail and in addition thereto perforating the spindle base to cause the lubricant contained in the reservoir surrounding the lower portion of the spindle base to circulate between the base and the bolster mounted therein and also between the bolster and the spindle rotating therein, thus insuring proper lubrication of the spindle for a long period of time without the necessity of replenishing the supply of lubricant and at the same time providing circulation and cooling of the lubricant being used.

Some of the objects of the invention having been stated, the invention will more fully appear when taken in connection with a detailed description of the drawing, showing a preferred embodiment of the invention, in which—

Figure 1 is an elevation of a spindle having the base thereof equipped with my invention;

Figure 2 is a vertical sectional view thru a spindle and base and showing my invention applied thereto.

Referring more specifically to the drawing, the numeral 10 indicates the conventional spindle rail in which the spindle bases 11 have heretofore been secured by means of a nut being threadably secured on the threaded portion 21 of the base to secure the base onto the spindle rail in association with a washer or gasket.

The spindle base has the conventional features of oil neck 12 with oil passageway 13 therein with closure 14 pivoted at 15, bolster 16, spindle 17, acorn 18 fixed on the spindle and having whorl 19 thereon for driving the spindle for rotation from some suitable source such as a belt (not shown) being mounted on the pulley. The bolster in which the lower portion of the spindle bolster is mounted is conventional and has slots therein thru which the lubricant entering thru passageway 13 may contact with the spindle.

My invention resides in the provision of a hollow member 20 restricted at its upper end and being interiorly threaded to engage threads 21 on the base and also in drilling or otherwise forming holes 23 and 24 in the base immediately below the threaded portion and also in providing holes 25 and 26 in the lower portion of the base whereby lubricant may circulate between the interior and exterior of the base.

The member 20 may be partially filled with a lubricant and screwed onto base 11, in which case the lubricant will flow into the interior of the base and contact with the bolster and spindle, or the member 20 may be secured in place and the lubricant introduced into the base in the conventional manner by pouring it into passageway 13, in which case it will flow down in the base and out into member 20 thru the holes in the sidewalls thereof. In either event a reservoir for the lubricant is provided.

In operating, the rotation of the spindle will heat the lubricant to a certain extent and this will cause the heated lubricant to flow mainly out thru the holes 23 and 24 into the reservoir, and new and cooler lubricant will flow into the base from the reservoir thru the lower holes 25 and 26. This will provide a circulatory system for each spindle base and will result in better lubrication for the spindles than has heretofore been obtained by the addition of a small quantity of lubricant from time to time, as this small amount of lubricant has heretofore soon become heated and worn out, forming residue to mix with the new lubricant added from time to time, thus resulting in worn spindles and inefficient operation. It is evident that the members 20 can be removed for cleaning easily, should the same be necessary.

It will be noted that a space 29 is provided in the bottom of member 20 for the accumulation of sediment in the lubricant and by having this space the sediment is not mixed with the lubricant thereby eliminating the wear on the spindle and bolster.

If desired, the lower end of the reservoir 20 may have a plurality of flattened surfaces 28 to enable it to be engaged by an ordinary wrench for installation and removal of the reservoir.

In the drawing and specification, there has been set forth a preferred embodiment of the invention, and although specific terms are employed, they are used in a generic and descriptive sense only and not for purposes of limitation, the scope of the invention being set forth in the appended claims.

I claim:—

1. In a spindle base for fiber preparation machinery, twisting and twining machinery, and the like, having a bolster, mounted in said base and a spindle rotatably mounted in said bolster, said bolster having openings in the lower portion thereof for lubrication of said spindle, the lower portion of said base being provided with perforations adjacent said openings, said base having other said perforation disposed above said openings and adjacent the periphery of said bolster, exteriorly disposed threads on said base serving for the reception of threaded means for securing the base to a spindle rail, a hollow member having its lower end closed and having a restricted threaded opening in its upper end adapted to engage said threads on the base to secure the base to the spindle rail and to provide a lubricant container surrounding the lower portion of the base.

2. In a textile machine having a spindle rail and a plurality of spindle bases mounted on said rail, and a bolster with a perforated lower end, mounted in each of said bases, the lower portion of each base having perforations adjacent perforations in said bolster, said base having other perforations disposed above said perforations in said bolster and adjacent the periphery of the non-perforated surface thereof and having a threaded portion disposed above said perforations, an individual lubricant container surrounding each spindle base and having a restricted threaded opening in the upper end thereof for engaging said threaded portion on the base to secure the container to the base and to secure the base to the spindle rail.

ALEXANDER R. DAVIS.